(12) United States Patent
Edson

(10) Patent No.: US 6,703,440 B2
(45) Date of Patent: Mar. 9, 2004

(54) WATERPROOF, DURABLE PRODUCTS MADE FROM RECYCLED RUBBER PRODUCTS

(76) Inventor: Gerald Edson, 1144 Black Diamond Rd. SW., Parnell, IA (US) 35325

(*) Notice: Subject to any disclaimer, the term of this patent is extended or adjusted under 35 U.S.C. 154(b) by 0 days.

(21) Appl. No.: 10/418,681

(22) Filed: Apr. 21, 2003

(65) Prior Publication Data

US 2003/0175449 A1 Sep. 18, 2003

Related U.S. Application Data

(62) Division of application No. 09/934,432, filed on Aug. 22, 2001, now Pat. No. 6,558,773.

(51) Int. Cl.⁷ .............................................. C08L 31/04
(52) U.S. Cl. .................. 524/515; 524/80; 524/503; 524/505; 524/524; 264/917; 264/918; 264/920; 264/921; 428/141; 428/920
(58) Field of Search ................................. 428/141, 920; 264/917, 918, 920, 921; 524/80, 503, 505, 515, 524

(56) References Cited

U.S. PATENT DOCUMENTS 6,495,635 B1 * 12/2002 Edson ........................ 525/240

* cited by examiner

Primary Examiner—David W. Wu
Assistant Examiner—William Cheung
(74) Attorney, Agent, or Firm—Daniel O'Connor

(57) ABSTRACT

Synthetic roofing products such as simulated slate and clay tile shingles, and other products, such as flower pots, floor coverings, plastic pallets and the like are compression molded from a mixture of ultra low density polyethylene binder and a filler which may comprise recycled rubber products such as E.D.P.M (ethylene propylene diene monomer) and S.B.R. (styrene butadiene rubber). Colorants may be added to the mixture prior to final molding. Many of the products, especially synthetic shingles, are less expensive, easier to handle, and more durable than the slate or clay tile shingle product simulated.

1 Claim, No Drawings

WATERPROOF, DURABLE PRODUCTS MADE FROM RECYCLED RUBBER PRODUCTS

This application is a divisional of U.S. Ser. No. 09/934,432 filed on Aug. 22, 2001, now U.S. Pat. No. 6,558,773.

DESCRIPTION OF THE RELATED ART

U.S. Pat. Nos. 5,086,552, 5,675,954 and 5,873,208 are directed to the use of old vehicle tires which are cut into various shingle shapes and applied directly as a roofing material. Although inexpensive, these products have a limited market because they are not aesthetically pleasing.

U.S. Pat. No. 5,648,144 issued in 1997 to Maurer, et al is directed to a synthetic slate roofing material which comprises a resin matrix and which employs inert fillers such as A.T.H. (aluminum tri-hydrate), Commercially available solid surfacing materials may be used along with additives and colorants in the final mix prior to homogenizing an-d molding. It is believed that the use of a resin binder greatly limits the flexibility of the synthetic slate roofing material described above.

Recently, James Crowe, Hamilton, Ontario, Canada, appeared on PBS's "THIS OLD HOUSE". Mr. Crowe showed and described a synthetic slate shingle which he said he invented in 1988. The shingle includes pelletized materials such as surplus rubber from from a plant which makes rubber products and surplus polyethylene and polypropylene from a disposable baby diaper plant. Although Crowe states that his binders are trade secrets, they are believed to be vinyl acetate and aluminum trihydrate. The content of binder in Crowe's product is thought to be about 60% by weight, and his rubber filler materials, about 40% by weight. By contrast, the subject invention employs up to about 60% by weight of rubber filler materials, and only 40% by weight binder. The ultra low density polyethylene binder employed by applicant is very pliable. It is capable of 1000% elongation, and acts like rubber, and is very tough.

DETAILED DESCRIPTION OF THE INVENTION

EXAMPLE 1

The Spanish replica tile is molded from the following composition:

E,P,D,M, (ethylene propylene diene monomers) scrap from rubber seals or car parts and S.B.R. (styrene butadiene rubber)—up to @ 50% by weight;

Elastomeric binders, E.V.A. (ethylene vinyl acetate) and U.L.D.P.E. (Ultra low density polyethylene)*
  @ 10–20% by weight, preferably @ 15% by weight;

Fire retardant, A.T.H. (Aluminum tri-hydrate)
  @ 20% by weight, —obtain "C" rating fire retardancy,
  @ 35% by weight, —for "A" rating fire retardancy, in combination with @ 4% by weight zinc oxide;

H.D.P.E. (High density polyethylene)
  @ 10–30% by weight, presently @ 25% by weight, and preferably, @20% by weight.

*the presently preferred U.L.D.P.E. is available from du Pont under the trademark, "Engage".

The above materials are blended together (adding the liquids to the solids) at a temperature in the range of 280 to 350 deg. F., preferably 300 deg. F. to form an homogeneous blend having the consistency of freshly mixed putty. The desired coloring, in this case a red clay coloring, is added at the time of blending, and mixing is continued until the blend is the desired color. The mixture is then passed through a 4–6 inch hydraulic-extruder at a temperature below 350 deg. F. The extruded mass is then placed in a water cooled compression mold, and molded into the final product at a temperature in the range of 160–325 deg. F. The resulting Spanish replica tile is about $\frac{1}{3}$ the weight of a Spanish clay tile, and is practically unbreakable and indestructible. The product is fire retardant and is believed to have a useful life much greater than the product it replaces. In addition, installation is much simpler and less expensive, and does not require specially skilled tile cutters. There should be no breakage losses during installation.

Other fire retardants may be used instead of ATH. These include "Plastisan B" made by 3V Corp., Georgetown, S.C.; "Phos-check", available from Solutia Corp., St, Louis, Mo.; and "Dover-phos-9228" made by Dover Chemical, Dover, Ohio. The amount of fire retardant used is determined by the fire retardant rating required.

EXAMPLE 2

The slate replica roofing material is manufactured from about the same formulation as employed in Example 1, but a little less H.D.P.E. is used to make the product slightly more flexible. Instead of red coloring, a gray slate coloring may be added. The slate replica roofing material is about $\frac{1}{3}$rd the weight of the natural slate product, and is practically unbreakable and indestructible. The product is hail-resistant, and is expected to have a much greater useful life than the natural slate product it replaces. The slate shingle is made in a standard size without any loss in the manufacturing process, which is the case with a natural slate shingle due to irregularities in the slate. Making natural slate shingles is very labor intensive and costly.

Installation of the replica slate shingle is much simpler and less expensive, and does not require special installation tools and specially skilled slate cutters. There is no breakage loss during installation.

EXAMPLE 3

The Italian replica roofing material is also manufactured from about the same formulation as set forth in Example 1. Since this roofing material is similar to the Spanish replica tile in desired rigidity, the formula is about the same as set forth in Example 1 above. Coloring is a matter of choice, and the molded Italian replica tile weighs about $\frac{1}{3}$rd less than the natural Italian tile presently in use. Cost for the replica tile is estimated to be about $\frac{1}{3}$rd the cost of the presently used, terra cotta tiles. The replica tile is also practically unbreakable and indestructible. It is much easier to install, and does not require special tools or specially skilled installers.

EXAMPLE 4

Flooring materials may also be made using the recycled crumb materials of the invention. For flooring materials, it is preferred that a polyolefin elastomer (H.D.P.E., high density polyethylene) recycled crumb rubber be used as the principal ingredient. Any desired size, thickness, shape, resiliency and color of flooring materials may be made by slight modification of the ingredients. A floor tile can be made simulating the appearance and texture of marble, slate, brick or other stone, and it can be adapted to the injection molding process described above. Larger floor coverings in sheet-like shapes may be made using conventional technology for sheet-forming from thermoplastic blends.

Coloring

The preferred binder of the invention is U.L.P.E. (ultra low density polyethylene) available from du Pont under the trademark "Engage". This binder comes in many colors, and the particular color, or combination of colors, may be selected to provide the desired color of the finished product. This binder also comes in "clear", and, in that case, color concentrates for paints and plastic can be used in the extrudate mix used to make the final product. Such color concentrates are commercially available, and one source is Bayer AKTG. Either a powder or a liquid color concentrate may be used. One surprising discovery is that up to about 20% by weight black rubber crumb can be used in combination with either the clear U.L.P.E. or the colored U.L.P.E. without influencing the final product color.

Recycled Filler Material

Both E.P.D.M. (ethylene propylene diamine monomer) and S.B.R. (styrene butadiene rubber, from shredded vehicle tires) are excellent filler materials in the molded products of the invention, and are typically obtained by recycling waste materials which would otherwise go to already full land fills. U.S. Pat. No. 5,927,627 issued Jul. 27, 1999 shows equipment and a method for obtaining rubber crumb from such waste materials as steel-belted vehicle tires, rubber seals and auto parts. Such filler materials have already been "vulcanized", so they are fire retardant. They are relatively inexpensive, water repellant and high temperature resistant, so they are especially suitable for use in roofing materials (shingles), floor coverings (tiles and sheet material), flower pots and utility containers. Other filler materials could also be used to replace all or a part of the preferred materials. Such replacement materials must have the needed properties, especially water and heat resistance.

What is claimed is:

1. Spanish and Italian replica tiles compression molded from a mixture comprising:

about 20–50% by weight ethylene propylene diamine monomer scrap and styrene butadiene rubber obtained from recycle vehicle tires;

about 10–30% by weight elastomeric binders selected from the group consisting of ethylene vinyl acetate and ultra low density polyethylene;

about 20–40% by weight fire retardant, aluminum tri-hydrate; and about 10–30% by weight high density polyethylene, wherein the said Spanish and Italian replica tiles further comprising a color concentrate to obtain the desired product coloring.

* * * * *